United States Patent
Miyasaka

(12) 
(10) Patent No.: US 6,455,465 B1
(45) Date of Patent: Sep. 24, 2002

(54) PHOTOCATALYST COATED PRODUCTS AND A METHOD FOR PRODUCING A PHOTOCATALYST LAYER

(75) Inventor: Yoshio Miyasaka, Aichi (JP)

(73) Assignee: Fuji Kihan Co., Ltd., Aichi (JP)

( * ) Notice: Subject to any disclaimer, the term of this patent is extended or adjusted under 35 U.S.C. 154(b) by 0 days.

(21) Appl. No.: 09/371,189

(22) Filed: Aug. 10, 1999

(30) Foreign Application Priority Data

Aug. 18, 1998 (JP) .......................................... 10-231711

(51) Int. Cl.⁷ ........................... B01J 23/00; B01J 21/04; B01J 23/02; B32B 15/04; B05D 1/02
(52) U.S. Cl. .................. 502/350; 502/439; 502/527.14; 502/527.15; 502/527.16; 502/523; 428/472; 428/472.1; 428/325; 428/701; 428/702; 427/427; 427/190; 427/453
(58) Field of Search ................................. 502/350, 439, 502/527.14, 527.15, 527.16, 523; 428/472, 472.1, 325, 701, 702; 427/427, 190, 453

(56) References Cited

U.S. PATENT DOCUMENTS

| | | | |
|---|---|---|---|
| 3,607,343 A | 9/1971 | Long et al. ................. 428/404 |
| 3,996,398 A | * 12/1976 | Manfredi .................... 427/451 |
| 4,228,670 A | 10/1980 | Corti et al. |
| 4,250,726 A | 2/1981 | Safian et al. |
| 4,581,913 A | 4/1986 | Reed |
| 4,714,622 A | 12/1987 | Omori et al. |
| 4,753,094 A | 6/1988 | Spears |
| 5,250,324 A | 10/1993 | Claar ....................... 427/376.6 |
| 5,399,207 A | * 3/1995 | Kemp ........................ 148/209 |
| 5,518,777 A | 5/1996 | Shimamune et al. ....... 427/454 |
| 5,541,096 A | * 7/1996 | Nomura et al. ............. 435/176 |
| 5,596,912 A | 1/1997 | Laurence et al. |
| 5,816,088 A | 10/1998 | Yamada et al. |
| 5,844,225 A | * 12/1998 | Kimock et al. ............. 428/216 |
| 6,013,372 A | * 1/2000 | Hayakawa et al. ...... 428/411.1 |
| 6,038,900 A | * 3/2000 | Miyasaka ..................... 72/53 |
| 6,106,955 A | * 8/2000 | Ogawa et al. .............. 428/469 |

FOREIGN PATENT DOCUMENTS

| | | | |
|---|---|---|---|
| EP | 00853142 A1 | 7/1998 | |
| JP | 2156-020 | 11/1990 | |
| JP | 8-333671 | 12/1996 | ........... C23C/10/26 |

\* cited by examiner

*Primary Examiner*—Mark L. Bell
*Assistant Examiner*—Patricia L. Hailey
(74) *Attorney, Agent, or Firm*—Dennis G. LaPointe; Mason & Associates, P.A.

(57) ABSTRACT

A photocatalyst coated product having excellent photocatalytic functions including a decomposing function and a hydrophilic function achieved by forming on the surface of a product to be treated a titania layer as a photocatalyst having high hardness and high adhesion with the product to be treated, using an easy blasting treatment. The photocatalyst coated product has a decomposing function including deodorizing, antibacterial and soil-resisting actions, and also a hydrophilic function, which is provided by having a titania layer formed on the surface of a product to be treated by injecting a titanium or titanium alloy-containing powder against the surface of the product to be treated which is a metal product, a ceramic or a mixture of them.

8 Claims, 2 Drawing Sheets

ND A METHOD FOR PRODUCING A
PHOTOCATALYST COATED PRODUCTS AND A METHOD FOR PRODUCING A PHOTOCATALYST LAYER

BACKGROUND OF THE INVENTION

1. Field of the Invention

The present invention relates to a photocatalyst coated products and a process for coating with titania ($TiO_2$) as a photocatalyst having a decomposing function including deodorizing, antibacterial and soil-resisting actions, and also a hydrophilic function, more particularly to a photocatalyst coated product comprising a titania layer formed on a surface of a product to be treated made of a metal, a ceramic or a mixture thereof by injecting a titanium or titanium alloy-containing powder against the surface of the product to be treated, and also to a method for producing a photocatalyst layer as a process for forming or coating the titania layer.

Photocatalysts containing as the major component titania having excellent decomposing and hydrophilic functions have been utilized conventionally in many fields. The decomposing function will now be described. Irradiation of ultraviolet light contained in the sunlight or fluorescent light upon titania causes generation of electrons and positive holes on the titania surface, and the electrons reduce the atmospheric oxygen into super oxide ions ($O_2$), whereas the positive holes oxidize the moisture deposited on the titania surface into hydroxyl group radicals (OH). These superoxide ions and hydroxyl group radicals carry out oxidative decomposition of organic compounds including soil and the like present on the titania surface.

To describe now the hydrophilic function, the superoxide ions and hydroxyl groups generated by the ultraviolet irradiation as described above decompose hydrophobic molecules present on the titania surface to produce hydroxyl groups, and the atmospheric moisture is adsorbed by the hydroxyl groups thus produced to form a thin water film, thus imparting hydrophilicity to the titania surface. Accordingly, photocatalysts are frequently utilized in lenses, interior materials and furniture, such as mirrors, wall papers and curtains for the purpose of imparting deodorizing, antibacterial and soil-preventing actions, because of their hydrophilic function as well as the decomposing function.

When these photocatalytic functions are to be utilized in products such as interior materials and furniture, the product is impregnated with titania as a major component of the photocatalyst and is irradiated well with ultraviolet light. As a technique of achieving this, it is practiced to form a titania layer on the surface of a product to be treated.

2. Description of the Prior Art

As one method of forming a titania layer, a product to be treated made of titanium or titanium alloy is oxidized on the surface to form an oxide layer or a titania layer utilizing its liability to undergo oxidation reactions, since titanium per se is an active metal and have particularly great affinity with oxygen.

As other methods for forming a titania layer, a sol-gel method and a binder method are employed.

According to the sol-gel method, an organic titanium sol such as of titanium alkoxide and titanium chelates, which are precursors of titania, is applied onto the surface of a product to be treated having heat resistance, such as glass and ceramics by means of spray coating and the like, and then dried to cause gelation, followed by heating to 500° C. or higher and form a stiff titania layer. Since titania particles are distributed over the entire surface of the product to be treated, the titania layer thus formed has high decomposition power and high hardness.

Meanwhile, according to the binder method, titania particles are immobilized on the surface of a product to be treated using a binder, for example, an inorganic binder such as silica or an organic binder such as silicone. The difference of the binder method from the sol-gel method is that the heating temperature may be the hardening temperature of the binder, so that the former requires a heat treatment at about 100° C. or lower and no high-temperature treatment.

The conventional photocatalyst coating methods described above involve the following problems.

(1) The method of forming a titania layer by surface-oxidizing a product to be treated made of titanium or titanium alloy involves problems in that titanium per se is expensive to cause cost elevation and that titanium has poor processability and the fields of its application are limited.

(2) The sol-gel method also involves a problem in that it requires a heat treatment at about 500° C. or higher for converting the organic titanium such as titanium alkoxide and titanium chelates, which are precursors of titania, into a titania layer, so that the product to be treated should have heat resistance, and that the product to be treated is limited to glass, ceramics and the like. If a titania layer is to be formed on the surface of a metal according to the sol-gel method, the metal surface is oxidized by the high-temperature heat treatment to cause reduction of commercial value due to deterioration and reduced luster.

The sol-gel method further involves a problem in that it requires much time and labor since the organic titanium is applied many times, that it requires an expensive equipment to cause cost elevation, and that harmful waste is by-produced.

(3) Meanwhile, the binder method can solve the problems inherent in the sol-gel method and enjoys merits in that it can treat various kinds of products and that it is relatively inexpensive. However, it involves a problem in that it is necessary to use as the binder a material which has high adhesion with the product to be treated and which is not susceptible to the decomposing function of the photocatalyst, and that selection of binder influences the effect of the catalyst.

Further, the titania layer formed according to the binder method has a hardness lower than that of the layer formed according to the sol-gel method, disadvantageously. In order to increase the hardness of the titania layer to be obtained according to the binder method, the amount of binder is increased to enhance adhesion. In this case, however, the amount of titania is reduced relative to the binder, and the titania layer shows poor decomposing power. On the contrary, if the amount of binder is reduced, the amount of titania to be exposed on the surface of the product to be treated is increased to show enhanced decomposing power, but the adhesion is reduced to readily cause peeling of the titania layer, resulting in the reduced hardness, disadvantageously.

SUMMARY OF THE INVENTION

The present invention was developed with a view to solving the problems described above, and it is an objective of the present invention to provide a photocatalyst coated product having excellent photocatalytic functions including the decomposing and hydrophilic functions which were imparted by forming by using a simple blasting treatment a titania powder as a photocatalyst having high hardness and high adhesion with products to be treated and a method for producing the photocatalyst layer.

In order to attain the above objective, the photocatalyst coated product according to the present invention comprises a titania layer formed on a surface of a product to be treated which is a metal product, a ceramic or a mixture of them; wherein a titanium or titanium alloy-containing powder is diffused, penetrated and oxidized into the surface of the product to be treated.

Meanwhile, the method for producing a photocatalyst layer as described above comprises injecting a titanium or titanium alloy-containing powder against a surface of a product to be treated which is a metal product, or against a ceramic or a mixture of them to effect diffusion of the titanium contained in the titanium or titanium alloy-containing powder over the surface of the product to be treated mentioned above and also oxidation of the titanium to form a titania layer.

Incidentally, the titanium or titanium alloy-containing powder is injected at an injection velocity of 80 m/sec or higher and under an injection pressure of 0.29 MPa or higher.

Further, the titanium or titanium alloy-containing powder has an average particle size of 20 to 800 μm, preferably 30 to 300 μm, and the shape of the powder, which may not be limited so long as it allows formation of titanium layer by the injection treatment, is preferably spherical or polygonal.

It should be noted here that in the present specification, the powder containing titanium as a major component is referred to as "the titanium or titanium alloy-containing powder" and includes those which have reacted with the atmospheric oxygen to have stable oxide layers ($TiO$, $Ti_2O_3$, $TiO_2$) formed on the surface thereon, respectively.

If a titanium or titanium alloy-containing powder (hereinafter referred to as "titanium powder") is injected at a high injection velocity against the surface of a product to be treated made of a metal, a ceramic or a mixture of them, a thermal energy is generated by the difference between the velocity of the powder before impingement upon the surface of the product to be treated and that after the impingement and in view of the law of energy invariability. Since this conversion of energy occurs only at modified portions brought about by the impingement of the titanium powder, localized temperature rise occurs in the titanium powder and near the surface of the product to be treated.

Meanwhile, since the temperature rise occurs proportional to the velocity of the titanium powder before the impingement, the temperature of the titanium powder and that of the surface of the product to be treated can be increased by increasing the injection velocity of the titanium powder. It is surmised here that since the titanium powder is heated on the surface of the product to be treated, the titanium contained in the titanium powder is activated to be adsorbed on the surface of the product to be treated, and also the titanium undergoes an oxidation reaction with the atmospheric oxygen to form a titania layer having photocatalytic functions on the surface of the product to be treated.

Thus, the photocatalyst coated product and the method for producing the photocatalyst layer according to the present invention, which are different from the conventional photocatalyst coating techniques, relate to a photocatalyst coated product having a titania layer formed on the surface of a product to be treated by diffusion and penetration of titanium into the product to be treated and by its oxidation reaction induced by the temperature rise occurred in the titanium powder and in the product to be treated when the titanium powder is impinged upon the product to be treated by a blasting treatment and to a method for producing the photocatalyst layer.

To describe more specifically, let us take, for example, cementation generally practiced. For example, when a metal product A is buried in a metal powder B to effect diffusion of the latter at a temperature t, the diffusion is carried out primarily by the metal vapor developed from the metal powder B or a metal halide vapor formed by a reaction of the metal powder with an additive, like carburization is carried out primarily by CO gas. Take carburization for example, there occurs no reaction between Fe contained in a ferrous metal product and CO by merely causing CO gas to deposit physically on the surface of the metal product as can be removed readily by external forces, heating or other physical methods. However, the CO gas is activated to be adsorbed on the Fe surface by application of heat or other energy in a predetermined quantity or more. The CO gas having undergone activated adsorption then undergoes thermal dissociation into carbon dioxide and carbon. The carbon formed in this reaction is supposed to diffuse into the Fe lattice to induce the carburization phenomenon.

In view of the above carburization phenomenon, according to the photocatalyst coating in the present invention, it can be considered that a titania layer is formed on the product to the treated through the following process.

For example, if a titanium powder is injected to impinge upon the surface of a product to be treated made of a metal, a ceramic or a mixture of them at an injection velocity of 80 m/sec or higher and under an injection pressure of 0.29 MPa or higher, the velocity of the titanium powder is reduced before and after the impingement. When the law of energy invariability is taken into consideration it can be surmised that a thermal energy is produced by the internal friction caused by deformation of the product to be treated occurred at the impinged portions, and the titanium powder is heated by this thermal energy on the surface of the product to be treated to effect activated adsorption of titanium by the product to be treated and diffusion into it, and that the titanium further reacts with the atmospheric oxygen to be oxidized and form a titania layer.

Incidentally, since the objective of the present invention is to effect both activated adsorption of titanium on the surface of the product to be treated and oxidation reaction of titanium utilizing the temperature rise of the titanium powder, it is essential to use a relatively small shot and not a heavy shot so that the titanium powder can be heated instantaneously by the thermal energy. Since titanium has a low density and relatively low thermal conductivity compared with other metals, localized concentration of heat is liable to occur, so that a powdery powder having a particle size of 800 μm to 20 μm, preferably 300 μm to 30 μm can be used.

The titanium powder desirably has a spherical or polygonal shape so as to carry out efficient heating of the titanium powder.

Further, titanium has good affinity with oxygen to form frequently an oxide layer on its surface and are stabilized. However, when a titanium power having such oxide layer is injected against the surface of a product to be treated as described above, the oxide layer is ruptured instantaneously by the impingement upon the product to be treated, and thus titanium is surmised to undergo activated adsorption on the surface of the product to be treated.

BRIEF DESCRIPTION OF THE DRAWINGS

The objects and advantages of the invention will become apparent from the following detailed description of preferred embodiments thereof provided in connection with the accompanying drawings in which.

DETAILED DESCRIPTION OF THE PREFERRED EMBODIMENTS

EXAMPLE 1

While the blast apparatus employed in Examples was a gravity blast apparatus, it may be of a suction siphon type among pneumatic blast apparatuses or of other blast apparatuses.

A rubber-molding die (heat-treated steel corresponding to SCM) was introduced as a product to be treated into a cabinet of the gravity blast apparatus through an inlet and outlet, and the above titanium powder was injected against the surface of the rubber-molding die under an injection pressure of 0.6 MPa and at an injection distance of 100 to 200 mm using a known compressor.

The titanium powder injected and dust thus formed drop into a hopper under the cabinet and ascend through a piping on the upward current to be fed into a recovery tank where the titanium powder is recovered. The dust in the recovery tank is guided by the stream in the tank from the top of the recovery tank through a piping to a dust collector to collect at the bottom of the dust collector, while a compressed gas is released through an exhauster located at the top of the dust collector.

Meanwhile, when compressed air from the compressor as a compressed air source is supplied through the piping, the titanium powder is force-fed together with the compressed gas to be supplied through a pipe to an injection nozzle having a nozzle diameter of 5 mm and is injected against the rubber-molding die present in the barrel of the cabinet, as described above.

TABLE 1

| Blast apparatus | Gravity blast apparatus |
|---|---|
| Product to be treated | Rubber-molding die (heat-treated steel corresponding to SCM) |
| Shot powder | |
| Material | Titanium |
| Granule | Average particle size 50 $\mu$m (#300) |
| Shape | Spherical |
| Injection pressure | 0.6 MPa |
| Injection nozzle diameter | 7 mm |
| Injection distance | 100 to 200 mm |

When the shot powder titanium was injected against the surface of the rubber-molding die under the above treating conditions, a titania layer was formed on the surface of the rubber-molding die, and the cleaning cycle of the die was extended to 2-fold or more compared with the prior art.

Figure 1:
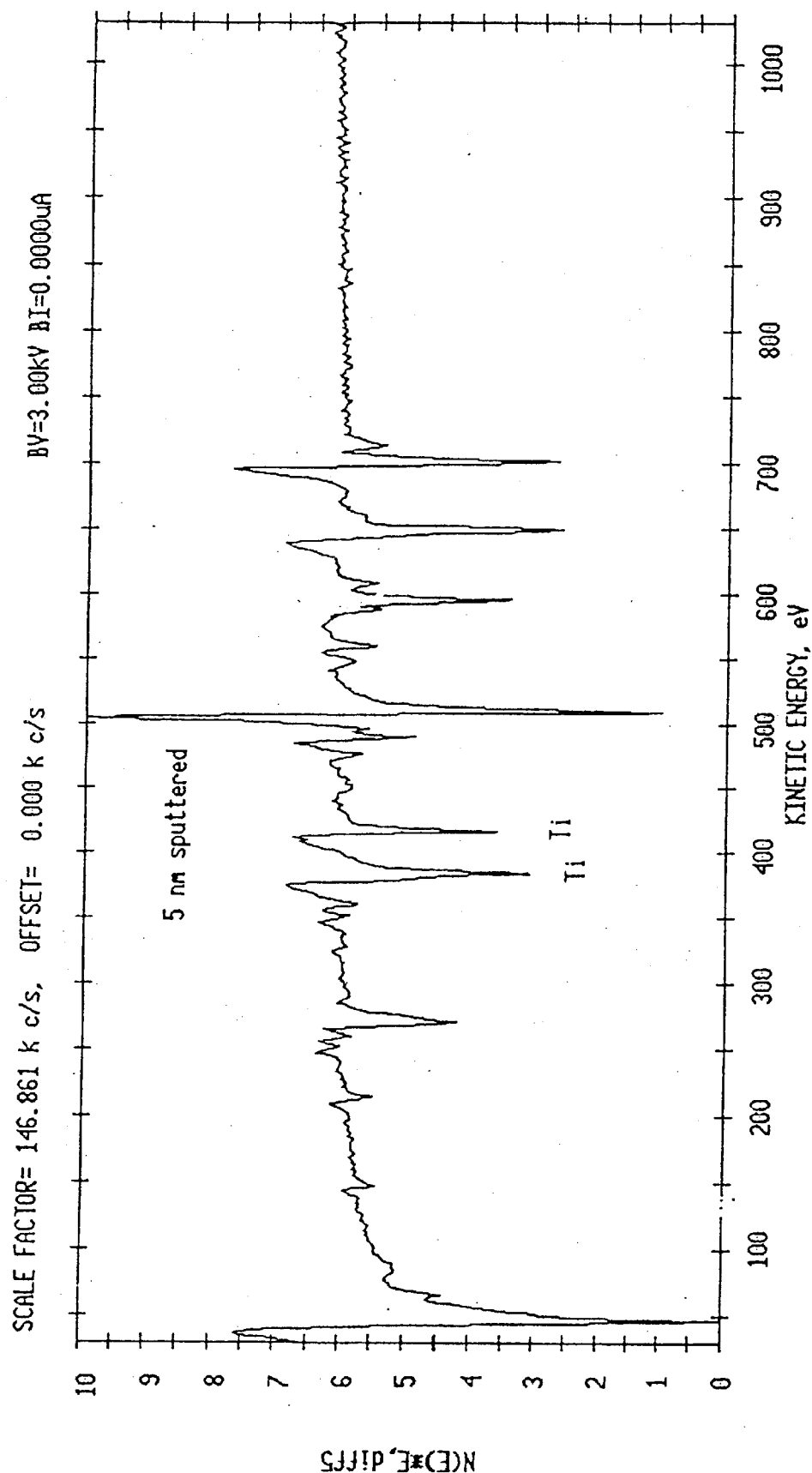
FIG. 1 is a graph showing the effect of titanium diffusion according to Example 1 of the present invention.

As is clear from the component analysis by Auger electron spectroscopy shown in FIG. 1, it is considered to be attributed to the titania layer formed on the surface of the rubber-molding die and to the photocatalytic functions of the titania layer that the amount of deposit including soil was decreased.

In FIG. 1, titanium peaks appear twice during 5 nm argon sputtering, and thus it was found that titanium is diffused in a large amount over the ultrasurface layer.

EXAMPLE 2

TABLE 2

| Blast apparatus | Gravity blast apparatus |
|---|---|
| Product to be treated | Drill (High Speed Tool Steel (corresponding to SKH51) |
| Shot powder | |
| Material | Titanium |
| Granule | Average particle size 40 $\mu$m (#400) |
| Shape | Spherical |
| Injection pressure | 0.5 MPa |
| Injection nozzle diameter | 7 mm |
| Injection distance | 100 mm |

Figure 2:
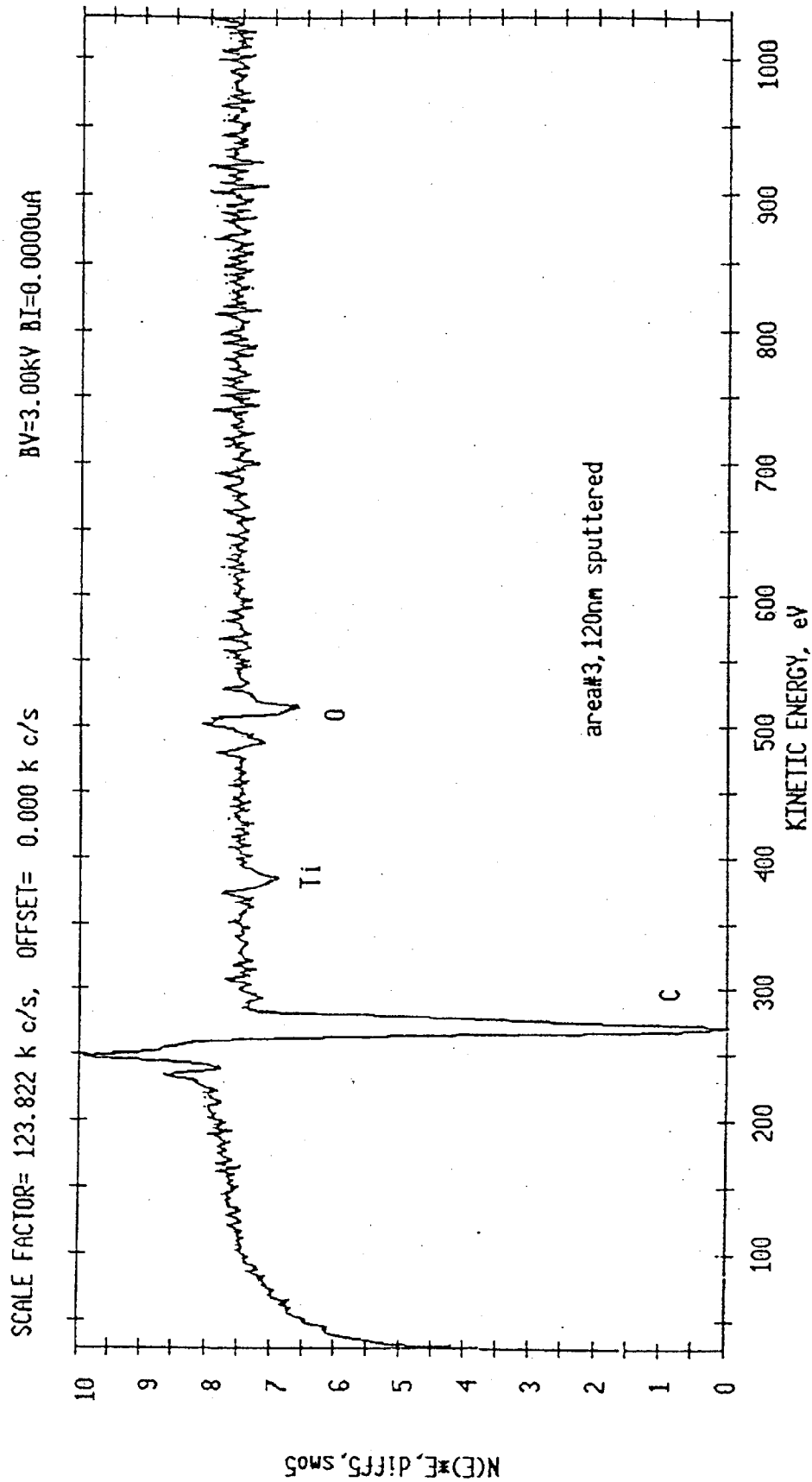
FIG. 2 is a graph showing the effect of titanium diffusion according to Example 2 of the present invention.

After a drill as a product to be treated was heat-treated by injecting against it a 40 $\mu$m silica bead shot having a hardness higher than that of the drill at an injection velocity of 200 m/sec or higher, the present invention was carried out under the above treatment conditions. The result of Auger electron spectroscopic analysis of the treated drill surface is shown in FIG. 2. A trace of titanium is observed at 120 nm, and it can be considered that the titanium had diffused into the drill to form a titania layer on the drill surface. Although drills made of high speed tool steels, which are close to pure iron, have conventionally been apprehended that they form built-up edges to have reduced lives, the life of the drill having the titania layer was elongated to about 5-fold by the photocatalytic functions of the titania layer formed on it.

EXAMPLE 3

TABLE 3

| Blast apparatus | Straight hydraulic blast apparatus |
|---|---|
| Product to be treated | Heat treatment jig (SUS304) |
| Shot powder | |
| Material | Titanium |
| Granule | Average particle size 100 um (#150) |
| Shape | Spherical |
| Injection pressure | 0.4 MPa |
| Injection nozzle diameter | 5 mm |
| Injection distance | 200 to 250 mm |

In Example 3, a heat treatment jig was used as a product to be treated. Heat treatment failure occurred due to scaling in the heat treatment jig, and the jig was subjected to descaling treatment or replaced periodically. However, when the present invention was carried out under the treatment conditions shown in Table 3, the period until occurrence of scaling was extended to about 2-fold compared with the prior art, and even when scaling occurred, descaling was able to be carried out easily. The reason is considered to be that a titania layer was formed on the surface of the heat treatment jig to prevent scaling from occurring by the decomposing function of a photocatalyst.

EXAMPLE 4

TABLE 4

| Blast apparatus | Gravity blast apparatus |
|---|---|
| Product to be treated | Radiator pipe (aluminum) |
| Shot powder | |
| Material | Titanium |
| Granule | Average particle size 100 $\mu$m (#150) |
| Shape | Spherical |
| Injection pressure | 0.4 MPa |
| Injection nozzle diameter | 7 mm |
| Injection distance | 100 to 150 mm |

If an aluminum radiator and an aluminum pipe are subjected to brazing at about 500° C., a brazing filler alloy employed melts to deposit on the aluminum pipe and cause reduction in heat exchange efficiency and drop in the commercial value, disadvantageously. Accordingly, the thus deposited brazing filler alloy is removed by blasting treatment or using a chemical agent. However, when the present invention was carried out under the above treatment conditions, there was observed no deposition of the brazing filler alloy because of the photocatalytic functions of a titania layer formed on the surface of the aluminum pipe.

EXAMPLE 5

TABLE 5

| | |
|---|---|
| Blast apparatus | Straight hydraulic blast apparatus |
| Product to be used | Wheel (aluminum alloy) |
| Shot powder | |
| Material | Titanium alloy (6A1-4V) |
| Granule | Average particle size 100 μm (#150) |
| Shape | Spherical |
| Injection pressure | 0.4 MPa |
| Injection nozzle diameter | 7 mm |
| Injection distance | 200 to 300 mm |

While appearance, abrasion resistance, etc. of a product are improved by subjecting it to coating, plating or the like after a shot-peening process, a cutting process or buffing, deposit including soil is giving rise to a problem in any process. When the present invention was carried out in a wheel as a product to be treated under the above treatment conditions, no rusting occurred even after about one month, and the amount of deposit including soil was smaller compared with the conventional products. Meanwhile, the soil deposited was able to be washed off easily with water, and thus the effect of the photocatalytic functions of the titania layer formed on the wheel surface was exhibited.

Molded products having excellent photocatalytic functions including the decomposing function and hydrophilic function were obtained by forming on the surface of each product to be treated a titania layer as a photocatalyst having high hardness and high adhesion with the product to be treated using an easy blasting treatment without causing reduction in the commercial value including deterioration, reduced luster, etc. to be caused by oxidation of the metal surface under high-temperature heat treatment like in the case where a titania layer is formed by means of sol-gel process, without requiring inefficient procedures of coating repeatedly with tin or an organic titanium nor expensive equipment and without by-producing harmful waste.

What is claimed is:

1. A photocatalyst coated product comprising:
   a photocatalytic titania layer formed on a surface of a product to be treated, the product to be treated being one of a metal product, a ceramic and a fixture thereof,
   wherein said product is treated by effecting diffusion d oxidation of one of a titanium and titanium alloy-containing powder over the surface of the product to be treated to form said titania layer, by injecting the one of the titanium and titanium alloy-containing powder against the surface of the product to be treated at an injection velocity of at least 80 m/sec and under an injection pressure of at least 0.29 MPa,
   wherein the one of titanium and titanium alloy-containing powder is heated by a thermal energy generated by the difference between a velocity of the powder before impingement upon the surface of the product to be treated and a velocity of the powder after the impingement, wherein a localized temperature rise occurs in the one of titanium an titanium alloy-containing powder near the surface of the product to be treated,
   wherein the one of titanium and titanium alloy-containing powder is heated on the surface of the product to be treated to effect activated adsorption of the one of titanium and titanium alloy-containing powder by the product to be treated and diffusion therein, and that the one of titanium and titanium alloy-containing powder further reacts with the atmospheric oxygen to be oxidized wherein the titania layer is formed, and
   wherein the photocatalyst coated product has a decomposing function, including deodorizing, antibacterial and soil-resisting actions, and a hydrophilic function.

2. The photocatalyst coated product according to claim 1, wherein the one of titanium and titanium alloy-containing powder has an average particle size of 20 to 800 μm.

3. The photocatalyst coated product according to claim 1, wherein the one of titanium and titanium alloy-containing powder has a spherical or polygonal shape.

4. The photocatalyst coated product according to claim 1, wherein the one of titanium and titanium alloy-containing powder has an average particle size of 30 to 300 μm.

5. A method for producing a photocatalyst layer comprising the step of:
   injecting one of a titanium and titanium alloy-containing powder having a stable oxide layer on the surface thereof against a surface of a product to be treated, the product to be treated being one of a metal product, a ceramic and a mixture thereof to effect diffusion of the titanium contained in the one of titanium and titanium alloy-containing powder over the surface of the product to be treated and also to effect oxidations of the titanium to form a photocatalytic titania layer, by injecting the one of the titanium and titanium alloy-containing powder against the surface of the product to be treated at an injection velocity of at least 80 m/sec and under an injection pressure of at least 0.29 Mpa,
   wherein the one of titanium and titanium alloy-containing powder is heated by a thermal energy generated by the difference between a velocity of the powder before impingement upon the surface of the product to be treated and a velocity of the powder after the impingement, wherein a localized temperature rise occurs in the one of titanium and titanium alloy-containing powder near the surface of the product to be treated,
   wherein the one of titanium and titanium alloy-containing powder is heated on the surface of the product to be treated to effect activated adsorption of the one of titanium and titanium alloy-containing powder by the product to be treated and difussion therein, and that the one of titanium and titanium aloy-containing powder further reacts with the atmospheric oxygen to be oxidized wherein the titania layer type is formed, and
   wherein the photocatalyst coated product has a decomposing function, including deodorizing, antibacterial and soil-resisting actions, and a hydrophilic function.

6. The method for producing a photocatalyst layer according to claim 5, wherein the one of titanium and titanium alloy-containing powder has an average particle size of 20 to 800 μm.

7. The method for producing a photocatalyst layer according to claim 5, wherein the one of titanium and titanium alloy-containing powder has a sperical or polygonal shape.

8. The method for producing a photocatalyst layer according to claim 5, wherein the one of titanium and titanium alloy-containing powder has an average particle size of 30 to 300 μm.

* * * * *